Patented May 14, 1929.

1,712,732

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

BLUE TETRAKISAZO DYES FOR COTTON AND PROCESS OF MAKING SAME.

No Drawing. Application filed September 19, 1925. Serial No. 57,467.

This invention relates to blue tetrakisazo dyes for cotton and the process for making same, which comprises forming an intermediate by coupling a diazo compound of a mono-acidyl-1:4-arylene-diamine with an arylamine not containing a free hydroxy group, diazotizing the intermediate, coupling the diazotized intermediate with 2-dinaphthylamine-5:5'-dihydroxy-7:7'-disulphonic acid and saponifying the product of the last-named coupling.

The first components used in the process are the mono-acidyl-1:4-arylene-diamines and their derivatives. Among the suitable compounds which may be used are, e. g., mono-formyl-, mono-acetyl-, or mono-oxalyl-1:4-phenylenediamine, 2-acetyl-amino-5-amino-anisol, 2-oxalyl-amino-4-chlor-5-amino-anisol, 2-oxalyl-amino-4-methyl-5-amino-anisol and their sulphonic acids, mono-acetyl-1:4-naphthalenediamine and its 6- or 7-sulphonic acid.

As second components, comprising the amino compounds not containing a free hydroxy group, there may be used, e. g., m-toluidine, p-xylidine, cresidine, mono-acetyl-m-toluylene-diamine, 4-acetyl-amino-2-amino-anisol, other amino-compounds of the benzene series suitable for another diazotization after having been coupled, alpha-naphthylamine, alpha-naphthylamine-1:6- or 1:7-sulphonic acid, and alpha-naphthylamine-2-methoxy-6-sulphonic acid.

The dyes obtained by this process are, in their dry form, dark powders, dissolving in water with a reddish to greenish-blue coloration, dyeing cotton from reddish to greenish-blue shades, which on diazotizing and developing on the fibre with beta-naphthol change only very little in color, but are remarkably increased in their fastness to washing. Those dyes having naphthalene derivatives as second components are superior, in their fastness to light, to the dyes having benzene derivatives as second components. The dyes are also characterized by their exceptional brightness.

Example 1.

180 parts of mono-oxalyl-paraphenylene-diamine are dissolved in a sodium carbonate solution containing 53 parts of sodium carbonate in 4000 parts of water. This solution is acidified with 280 parts of a 31% hydrochloric acid solution, and the acid mix is diazotized at 15° C. with a sodium nitrite solution containing 69 parts of sodium nitrite. 223 parts of 1:6-Cleve's acid is dissolved in a solution of 53 parts of sodium carbonate and 170 parts of sodium acetate in 4000 parts of water. To this last named solution is added the diazo solution prepared as above. The coupling is complete in a few minutes. The intermediate formed by the coupling is acidified with 750 parts of a 31% hydrochloric acid solution and is then diazotized with a solution of 69 parts of sodium nitrite in water. This second diazotization is complete after one hour's stirring at 15-20° C. It is combined at 0-5° C. with a solution of 231 parts of 2-dinaphthylamine-5:5'-dihydroxy-7:7'-disulphonic acid in water containing 700 parts of sodium carbonate. After stirring five hours the coupled product is heated to 70° C. and salted out. The unsaponified dye is soluble in water with a bright reddish-blue color, turning greener with acid. The paste stirred up with 3000 parts of water is heated up to boiling, then 150 parts of sodium hydroxide, used as a 30% solution, are added and the liquid is kept boiling for 30 minutes. The saponified dye shows a greener shade than the unsaponified one, but turns redder with acid. By neutralizing the excess alkali with acid the dye is precipitated and can be filtered. As a dry powder it has a bronzy appearance. It dissolves in water with a bright blue color. It dyes cotton in bright blue shades, can be diazotized on the fibre and after developing with beta-naphthol shows a shade somewhat greener and brighter than the direct one, but of a very good fastness to washing and to light.

On reducing with stannous chloride this dye will give the following compounds: 2-dinaphthylamine - 5:5' - dihydroxy - 6:6' - diamino-7:7'-disulphonic acid, 1:4-naphthylenediamine-6-sulphonic acid, and paraphenylenediamine.

*Example 2.*

Instead of 180 parts of oxalyl-paraphenylenediamine as in Example 1, 230 parts of 1-amino-benzene -4-acetyl - amino -2- sulphonic acid are used as the first component, all other conditions being the same as in Example 1. The dye is even much greener and brighter than the one from the paraphenylenediamine, having a still better fastness to light and, in spite of the additional sulpho group, the same good fastness to washing after development with beta-naphthol.

On reducing with stannous chloride the dye will give the following compounds: 2-dinaphthylamine - 5:5' - dihydroxy - 6:6' - diamino-7:7'-disulphonic acid, 1:4-naphthylenediamine-6-sulphonic acid, and paraphenylenediamine sulphonic acid.

*Example 3.*

Substituting for the 180 parts of oxalyl-paraphenylenediamine as in Example 1, 280 parts of 1-acetyl-amino-4-amino-naphthalene-6-sulphonic acid, leaving all other conditions the same, a blue dye is obtained which is, both on direct and developed shade, slightly redder than that of Example 2, the other properties being similar to those of Example 2.

On reducing with stannous chloride this dye will give the following compounds: 2-dinaphthylamine - 5:5' - dihydroxy - 6:6' - diamino-7:7'-disulphonic acid and 4 moles of 1:4-naphthalene-diamine-6-sulphonic acid.

*Example 4.*

230 parts of 1-amino-benzene-4-acetyl-amino-2-sulphonic acid are diazotized as in Example 2. There is added to the diazo compound a solution of 107 parts meta-toluidine in 1500 parts of water and 140 parts of a 31% hydrochloric acid. Coupling temperature is 15-20° C. The mineral acidity is neutralized with sodium acetate. The coupling will be complete after five to six hours stirring. After acidifying again with hydrochloric acid the intermediate dye is filtered. The paste is stirred up with 4000 parts of water and dissolved with caustic soda, containing 60 parts of 100% sodium hydroxide. After cooling down to 10° C. the solution is acidified with 420 parts of hydrochloric acid (31%) and diazotized at 15-20° C. with 69 parts of sodium nitrite. After about one hour's stirring the diazotization is complete. It is combined at 0-5° C. with a solution of 231 parts of 2-dinaphthylamine-5:5'-dihydroxy-7:7'-disulphonic acid in water containing 700 parts of sodium carbonate. The coupling shows a bluish-violet color. The dye is precipitated with salt and filtered. The paste is saponified as shown in Example 1. The saponified dye shows a bluer shade than the unsaponified one. It dyes cotton in bright bluish-violet shades, which on diazotizing and developing on the fibre with β-naphthol turn into a bright reddish-blue of a very good fastness to washing.

On reducing with stannous chloride this dye will give the following products: 2-dinaphthylamine - 5:5' - dihydroxy - 6:6' - diamino-7:7'-disulphonic acid, paraphenylenediamine sulphonic acid, and 2:5-toluylenediamine.

By suitably varying the first, second or last components in the examples given, using suitable proportions, a large number of valuable blue tetrakisazo dyes for cotton may be prepared. Suitable changes may be made in the operating conditions without materially affecting the dyes obtained.

The following structural formulas are generally indicative of the dyes formed in the various examples. The formula of the dye of Example 1 obtained after development is also given for illustrative purposes.

*Structural formula of Example 1 before development.*

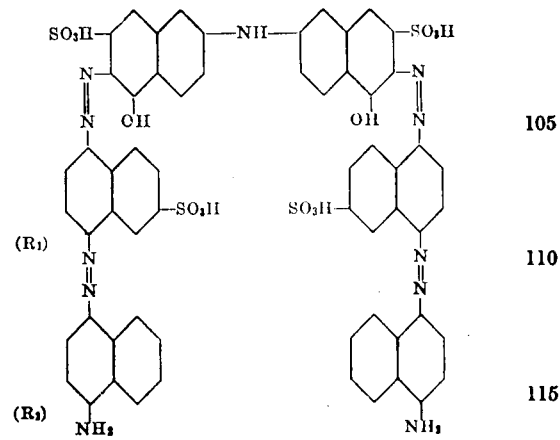

*After development with beta-naphthol.*
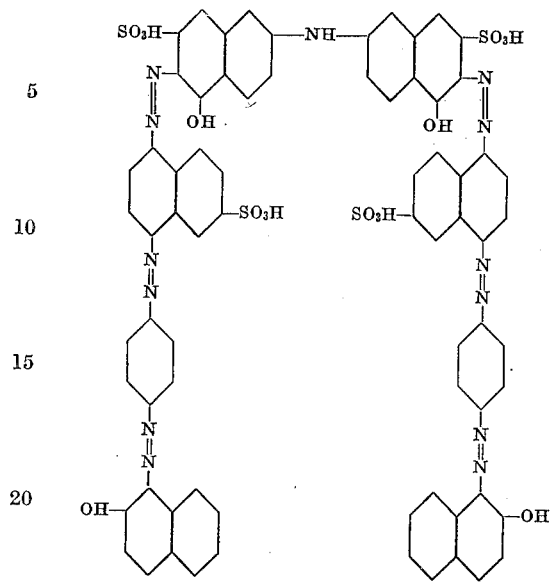
*Structural formula of Example 2 before development.*
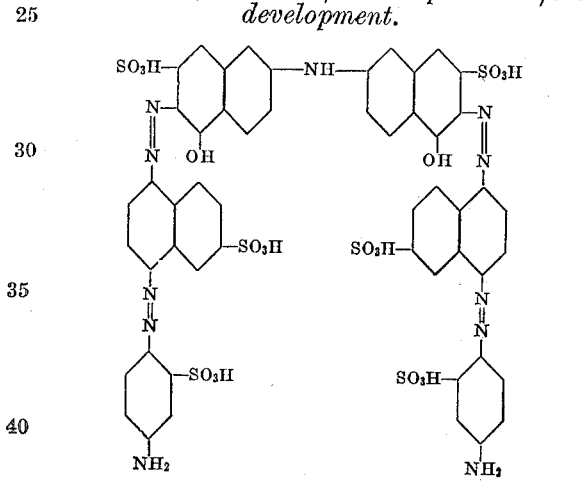
*Structural formula of Example 3 before development.*
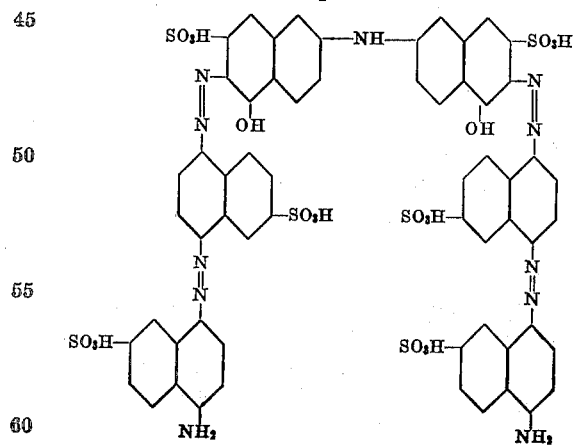
*Structural formula of Example 4 before development.*
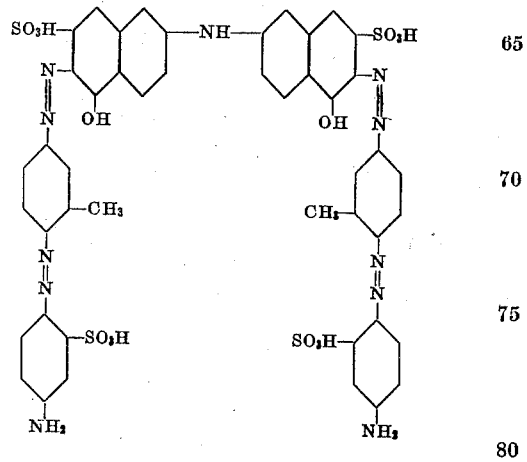
*Structural formula of a dyestuff with cresidine before development.*
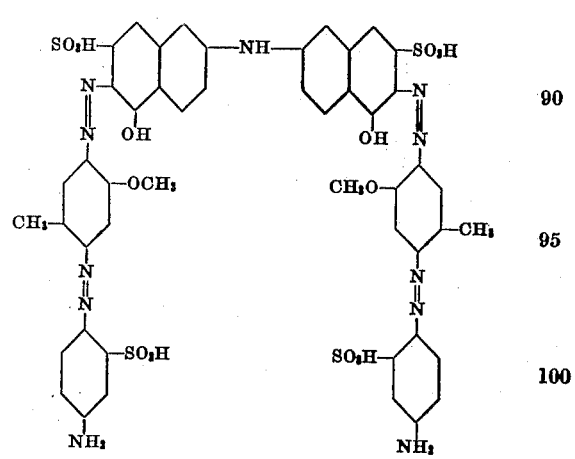
I claim:
1. Blue tetrakisazo dyes for cotton having the following structural formula:
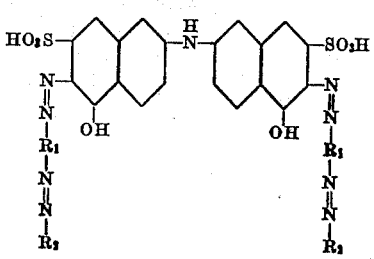

in which $R_1$ represents an aryl group free from hydroxy groups, and $R_2$ represents an aryl group containing but one free amino group, said amino group being in the para position, and said aryl group containing no other auxochrome group, said dyes being in their dry form dark powders, dissolving in water with a reddish- to greenish-blue coloration, yielding on reduction with stannous chloride and hydrochloric acid, among other products, 2-dinaphthylamine-5:5'-dihydrox-6:6'-diamino-7:7'-disulphonic acid, dyeing cotton reddish- to greenish-blue shades, and which dyes, when diazotized, and developed on the fibre with beta-naphthol, give bright blue colors which are fast to washing and light.

2. A blue tetrakisazo dye for cotton having the following probable formula:

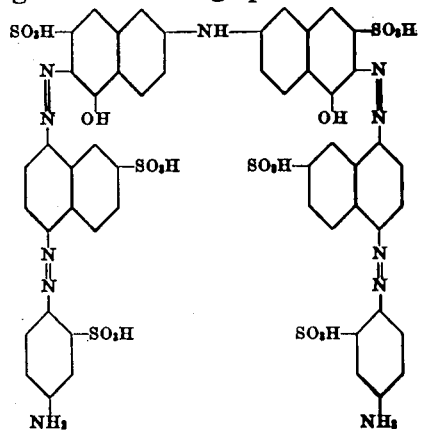

In testimony whereof I affix my signature.

HENRY JORDAN.